United States Patent [19]

Haines

[11] Patent Number: 4,932,098
[45] Date of Patent: Jun. 12, 1990

[54] GROOMING AID FOR COLLECTING DEBRIS

[75] Inventor: Richard F. Haines, Los Altos, Calif.

[73] Assignee: The United States of America as Represented by the United States National Aeronautics and Space Administration, Washington, D.C.

[21] Appl. No.: 237,037

[22] Filed: Aug. 29, 1988

[51] Int. Cl.⁵ .............................................. A47L 5/38
[52] U.S. Cl. ..................................... 15/301; 15/345; 15/346; 15/247; 248/99
[58] Field of Search .................... 15/345, 346, 301; 312/1; 248/99, 100, 101

[56] References Cited

U.S. PATENT DOCUMENTS

| | | | |
|---|---|---|---|
| 2,972,353 | 2/1961 | Quest | 312/1 |
| 2,977,956 | 4/1961 | Smith et al. | 312/1 |
| 3,051,164 | 8/1962 | Trexler | 312/1 |
| 3,492,987 | 2/1970 | Parker | 312/1 X |
| 4,108,509 | 8/1978 | Piet et al. | 312/1 |
| 4,327,760 | 5/1982 | Lancaster | 312/1 X |
| 4,712,270 | 12/1987 | Palmer | 15/345 |
| 4,780,927 | 11/1988 | Clayton | 15/345 |
| 4,809,391 | 3/1989 | Soldatovic | 312/1 |
| 4,820,000 | 4/1989 | Jacobson | 312/1 |

Primary Examiner—Frankie L. Stinson
Attorney, Agent, or Firm—Darrell G. Brekke; John R. Manning; Charles E. B. Glenn

[57] ABSTRACT

A device composed of a clear plastic cover, supported by a ribbed framework which is attached to a collar all of which define a cavity. The collar has at least one large aperture for receiving an appendage to be groomed within the cavity. The cover is provided with slits for receiving the hands of an individual conducting a grooming service. A vacuum hose for collecting unwanted material produced during grooming is also included within the cavity.

11 Claims, 3 Drawing Sheets

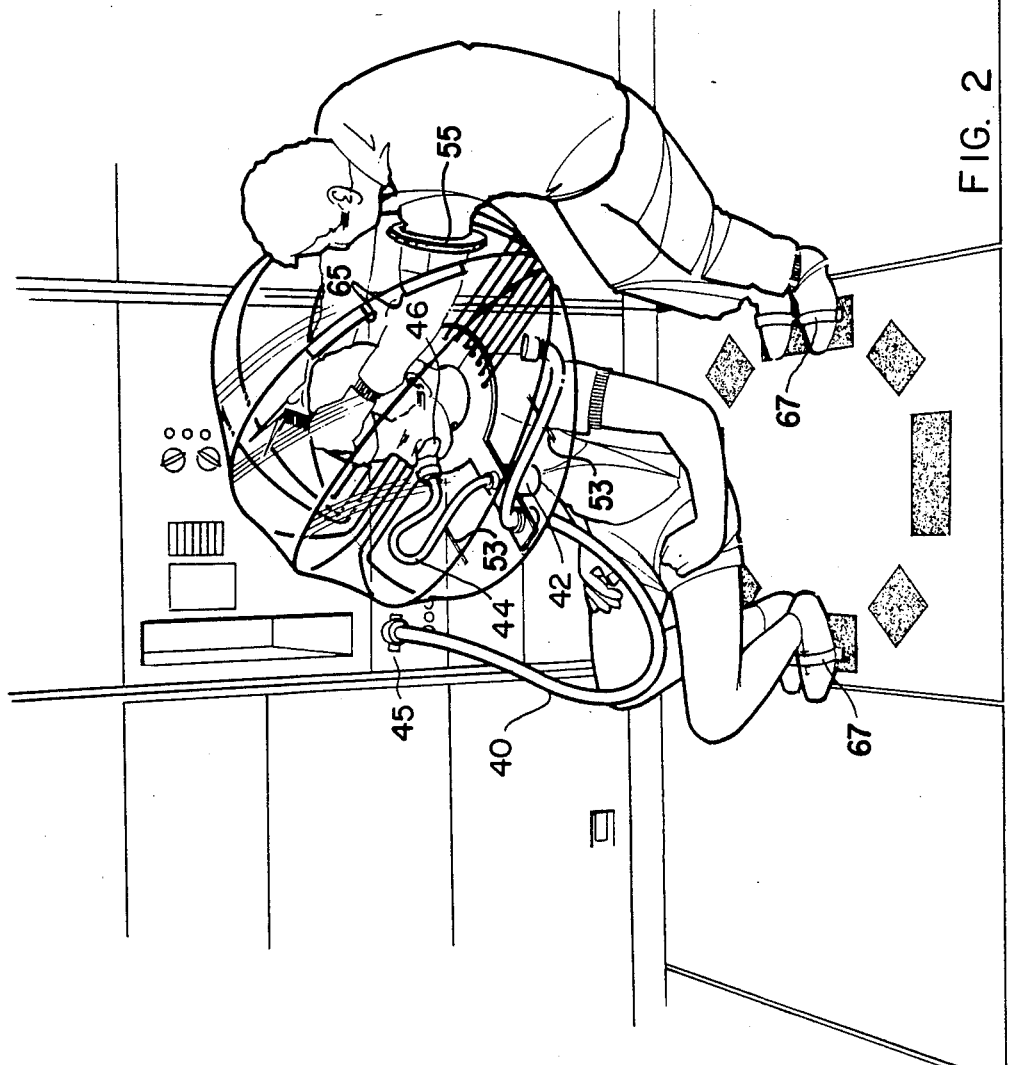

GROOMING AID FOR COLLECTING DEBRIS

BACKGROUND OF THE INVENTION

1. Field of the Ivention

The instant invention relates to a device for collecting particles produced by the grooming activities of crew members during manned space flight missions.

Most of the manned space flight missions to date have been short flights. This is especially true of missions flown by the United States. Recently cosmonaut Yuri Romanenko of the Soviet Union made space flight history by operating his craft in space for three hundred and twenty-six consecutive days.

The ability to maintain the morale of crews during such an extended space flight mission is of great importance if missions are to be performed in a professional and efficient manner. The ability to meet personal grooming needs and requirements of such a space crew would help sustain the morale of such a crew. Providing equipment which allows a crew to perform grooming activities, such as hair cutting, shaving, manicuring, etc., on board an extended flight mission is one means for meeting the crew's personal requirements.

Cosmonauts manning long term Soviet missions have shaved with a simple electric razor having rotating heads. Shaved hair is disposed of with the aid of a suction hose inserted into a foot restraint of an ergometer. Of course, this is a make-shift device which lacks compatibility of parts and creates storage problems.

In view of the foregoing, the instant invention relates to a device designed to care for the personal grooming needs of a flight crew on extended missions by allowing them to use equipment which is built for such a purpose, and which can be easily stored.

The device of this invention is portable and can be conveniently used to dispose of hair, nails, and flaky skin. Other particles produced during grooming activities, such as the residue of aerosol sprays, water droplets, etc. can also be disposed of by the device of the invention without contaminating the cabin or living quarters of the crew.

Summary of the Ivention

This invention is a device composed of a clear plastic cover, a ribbed framework and a collar. The cover is supported by the ribbed framework which in turn is attached to the collar. The collar has at least one large aperture for receiving an appendage to be groomed. The cover is also provided with slits for receiving the hands of an individual conducting a grooming service. The cover also has bottom slits allowing an indiviual using the device to conduct self-grooming services. A vacuum hose for collecting unwanted material produced during grooming is also included within the cover.

BRIEF DESCRIPTION OF THE DRAWINGS

FIG. 2 is a perspective view of the device being used to trim the hair of a crew member;

Fig. 3 is similar to Fig. 2;

DETAILED DESCRIPTION OF THE INVENTION

Figure 1:
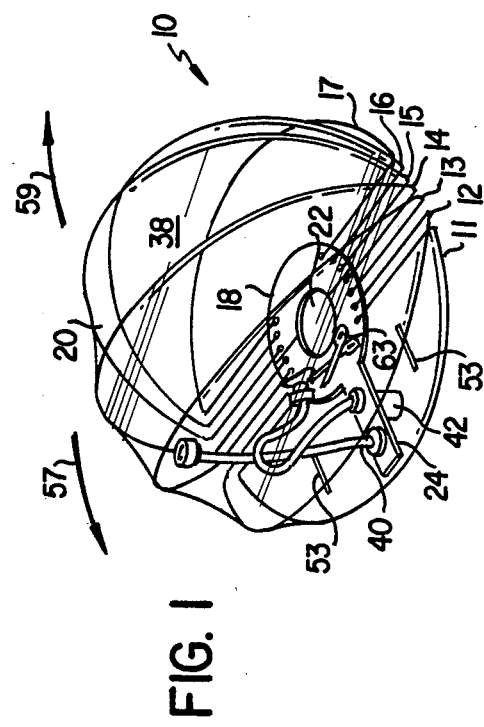
FIG. 1 is a perspective view of the device of the invention.

With reference to FIG. 1, device 10 is the device of the claimed invention. The basic components of device 10 include ribs 11-17, collar 18 and a clear flexible single-piece cover 20. Collar 18 is a thin circular structure having a circular aperture 22 in its center. The diameter of circular aperture 22 is about one-half that of the outer diameter of circular collar 18. Integrally connected to collar 18 is an arm 24 having the same thickness as collar 18 and having a length approximately equal to the inside diameter of collar 18. Attached to opposite portions of collar ribs 11-17.

Figure 6:
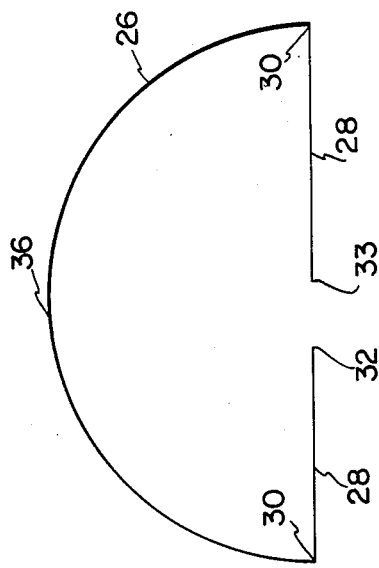
FIG. 6 is a plan view of a single rib used in the ribbed framework of the invention.

As shown in Fig. 6 each rib 11-17 has an arcuate portion 26 and a pair of linear segments 28. Linear segments 28 are constructed so that a first end 30 of each linear segment 28 is integrally attached to the arcuate portion of an associated rib. The second ends 32 and 33 of the pair of linear segments 28 of each rib face each other, and with the linear segments 28 of an associated rib, lie in a plane that includes the arcuate portion of the rib. The ribs may be constructed of metal and may be of a gauge similar to the wire used to construct clotheshangers. Ends 32 and 33 of each linear segment 28 of ribs 11-17 are hingedly attached to diametric points on the periphery of the collar. For instance the collar may have attached to its surface a first series of knuckles (not shown) and a second series of knuckles (not shown). The second series of knuckles are diametrically positioned on the collar relative to the first. The ends 32 and 33 of ribs 11-17 are used as pintles. Ends 32 of ribs 11-17 are inserted into the first series of knuckles and ends 33 of ribs 11-17 are inserted into the second series of knuckles, and the ends 32 and 33 are rotatable within the knuckles, and hingedly connect ribs 11-17 to collar 18.

Alternatively, sockets may be drilled into the sides of the collar and ends 32 and 33 of ribs 11-17 may be rotatably seated within the sockets.

As seen in Fig. 1 rib 14 is located on the collar so that its apex 36 lies approximately above the center of aperture 22 of collar 18. In this position linear segments 28, of rib 14, have their ends 32 and 33 attached approximately on or near a diameter of circular collar 18 and a folding hinge line 19.

Ribs 13 and 15 have their linear segments 28 attached to collar 18 so that these linear segments are parallel to, and positioned on either side of the linear segments of ribs 14; linear segments 13 and 15 are spaced an equal linear distance from the linear segment of rib 14.

Although the linear segments of ribs 13 and 15 are parallel to one another the planes defined by the linear segments, and the arcuate portions of each of these ribs are not parallel as apexes 36 of ribs 13 and 15 are spaced a greater distance from one another than are their respective linear segments.

Ribs 16 and 12 are fastened to the collar on either side of rib 14 at points which lie approximately two times the linear distance from the linear segments of rib 14 than do the linear segments of ribs 13 and 15. The planes defined by the linear segments and the arcuate portions of ribs 12 and 16 are not parallel to one another as apexes 36 of these ribs are also spaced a greater linear distance from one another than their respective linear segments.

Ribs 11 and 17 also have linear segments with ends 32 and 33 attached to the periphery of collar 18. The ends 32 and 33 of ribs 11 and 17 are positioned at an equal distance from either side of the linear segments of rib 14 at points which are spaced approximately three times the linear distance from linear segments 28 of rib 14 than are the linear segments of ribs 13 and 15. The apexes of ribs 11 and 17 lie at about a forty-five degree angle relative to the apex of rib 14 and therefore these two ribs lie in approximately the same substantially horizontal plane perpendiucular to the plane defined by rib 14.

The collar 18 and the ribs 11-17 form a supporting substructure or a framework for single-piece cover 20 which is transparent and flexible. The cover may be a laminate composed of different plastics or of the same plastic. Alternatively, the cover may be formed of only one sheet of plastic. Plastic such as polyethylene, polypropylene or polyethylene terephthalate may be used. The cover lies over the supporting ribs and may be attached, for example by staples, velcro fasteners, or snap fasteners to the underside of collar 18. As seen from Fig. 1, the structure described is a semi-circular structure having a cavity 38. Access is permitted to the cavity through aperture 22, and two bottom slits 53 and two tops slits 55. Bottom slits 53 are used by the individual within cavity 38. These slits allow one to perform self-grooming services. Bottom slits 53 have overlapping rubber flaps (not shown) to seal the slits when the individual within cavity 38 withdrawals his hands from cavity 38.

Top slits 55 may be parallel neighboring slits formed in a midportion of single-piece cover 20 located between any of ribs 11-17. A barber gains access to cavity 38 by placing his hands through top slits 55 as shown in Fig. 1 and 2. On the outside surface of cover 20, positioned over top slits 55, as shown in Fig. 2, are a plurality of overlapping rubber flaps 65. Rubber flaps 65 seal slits 55 to maintain a slight vacuum in cavity 38 when the barber removes his arms from cavity 38. Although not deoicted, the overlapping flaps may form a structure that resembles the iris of diaphram in a single lens reflex camera.

Collar 18, as discussed above, has an arm 24 integrally connected thereto. The arm 24 is a support for vacuum hose 40 (FIGS. 1 and 2) and for air filter 42 and breathing tube 44. Vacuum hose 40 as seen more clearly in FIG. 2 is attached at a first end to the vacuum side of a vacuum pump 45. A portion of vacuum hose 40 is supported by passing it through a hole in arm 24, and an open end of the hose is positioned in cavity 38 defined by collar 18, ribs 11 through 17 and cover 20. The section or open area of arm 24 between vacuum hose 40 and arm 24 may be packed with suitable material to seal the area where the hose protrudes therethrough to help maintain a slight vacuum within cavity 38.

The air filter 42 is composed of a perforated plastic structure having a porous-cover, for example a cloth cover. The filter is tapered at its neck for positioning the filter through a hole in arm 24 as shown. Breathing tube 44 is fastened to the neck of the filter which secures air filter 42 to arm 24. Breathing tube 44 includes mouth piece 46 to be used as shown in FIG. 2. Although not depicted, the overlapping flaps may form a structure that resembles the iris diaphram in a single lens reflex camera.

Figure 4:
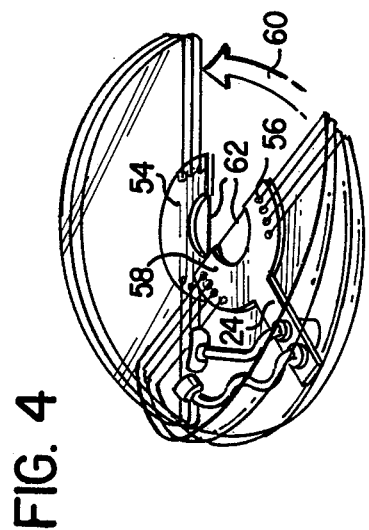
FIG. 4 is a perspective view of the device with the ribbed framework collapsed and its collar partially opened.

As seen in FIG. 4, the collar may be formed of two half sections 54 and 56, wherein arm 24 is integrally connected at a midpoint of the collar about one quarter the circumferential distance of the collar from the linear segments 28 of rib 14.

In a first embodiment the two half sections 54 and 56 are connected to one another by hinges. These hinges are constructed of material similar to the material sold under the trademark VELCRO, and therefore the hinge pieces can be quickly and easily disconnected from one another. The hinges (not shown) are positioned on the underside of collar 18 across hinge line 19.

In a second embodiment, the two half sections 54 and 56 of collar 18 are connected by a pivot pin 58. By this construction a first end of half section 56 of collar 18 lies above a first end of half section 54. When the collar sections are brought together to form aperture 22, the second end of half section 56 also lies above the second end of half section 54. The half sections at their non-pivotally connected ends may be connected by a pin or other fastener device (not shown).

In order to gain access to device 10 to cut hair, in accordance with the first embodiment, ribs 15-17 are folded in one direction as shown in FIG. 4, and ribs 11-14 are folded in an opposing direction, relative to ribs 15-17. The two VELCRO type hinges are released and the astronaut receiving the hair cut positions his neck between collar half sections 54 and 56 which are then rejoined by the VELCRO type fasteners.

Figure 3:
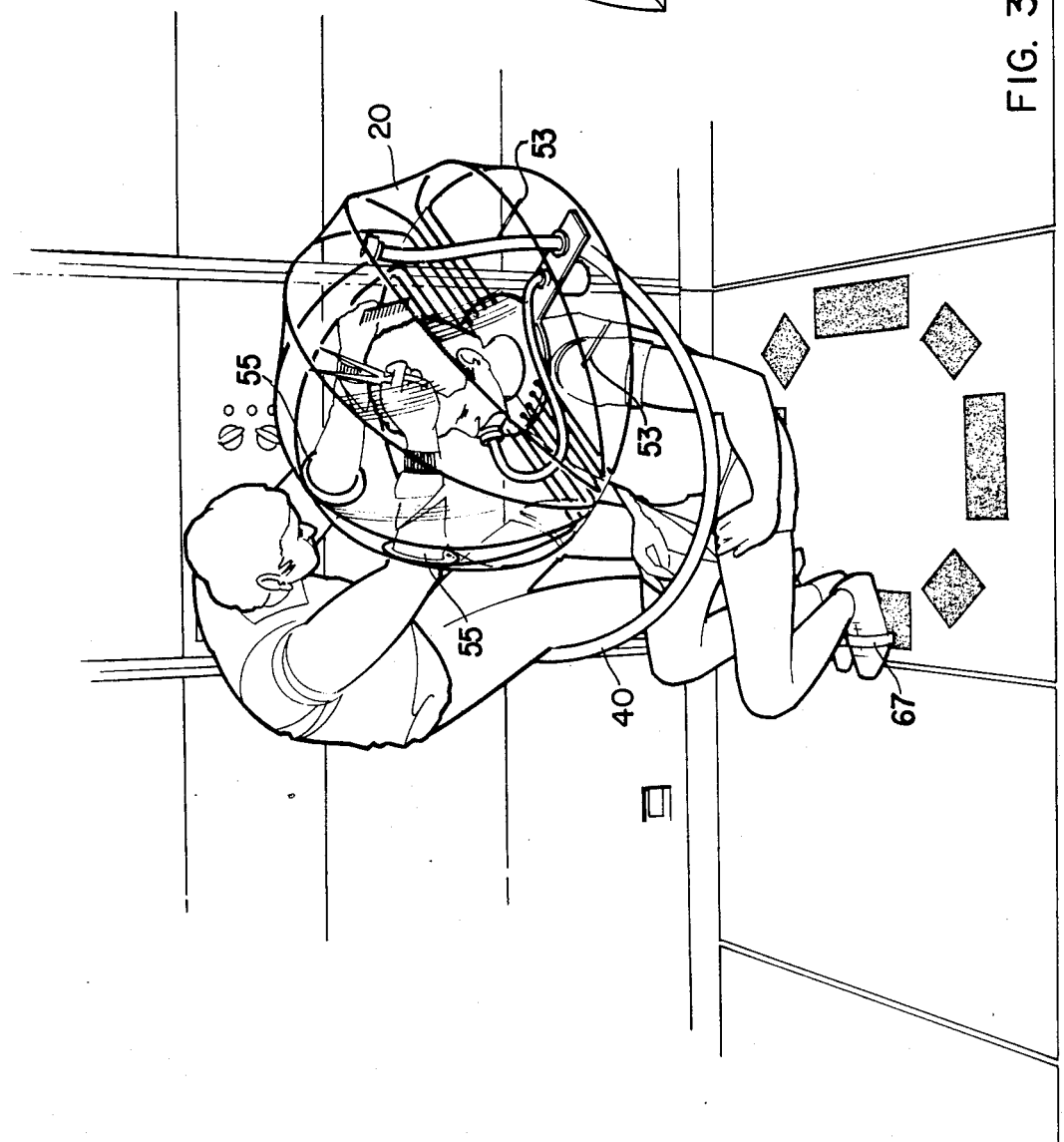
FIG. 3 is a perspective view of the device.

To gain access to device 10 to cut hair, the velcro hinges, in accordance with the first embodiment are removed or the pin connecting the second ends of the collar halves, in accordance with the second embodiment, is removed. As shown in FIG. 4 the collar is opened by rotating collar half section 54 in the direction of arrow 60. Cover 20 is constructed of a sufficient amount of material to accommodate such movement. The astronaut positions his neck within the opening of the collar, under the cover, and then the collar half sections are closed about his neck. The hinges are replaced or the removed pin is then replaced to connect the second ends of half sections 54 and 56. Thereafter the ribs are unfolded returning them to their position shown in FIG. 1. In embodiments one and two the astronaut's head is positioned within cavity 38 as shown in FIGS. 2 and 3.

In embodiments one or two the device 10 has a flexible circular seal flap 62 (e.g., a rubber flap) attached to the circumference of the inside diameter of collar 18. Seal flap 62 as shown in FIG. 4 has two half sections, each section being secured to an associated collar half section. When the half sections of the collar, 54 and 56 are closed about the astronauts neck seal flap 62 conforms to the contour of the astronauts neck maintaining the slight vacuum cavity 38. Alternatively, the astronaut receiving the hair cut may be fitted with a separate flexible plastic or rubber cylindrically-shaped collar (not shown). This collar is fastened about the neck of the astronaut and is attached at its top portion to the top or bottom portion of collar 18 and secured thereto. A bottom portion of the cylindrically shaped collar is draped around the persons neck and the cylindrically shaped collar has a skirt with a drawstring. The string is tightened in a comfortable manner to seal the aperture and to help maintain the slight vacuum within cavity 38 relative to the cabin.

To cut the barber or groomer places his arms through top slits 55 in cover 20 parting overlapping rubber flaps 65; the astronaut places the mouthpiece 46 of the breathing tube 44 in his mouth, and the barber, by manipulating scissors and a comb, is able to cut the astronaut. The astronaut can cut his own hair, or shave his facial hair by putting his own arms through bottom slits 53 (FIG. 1) in the bottom of single-piece cover 20.

As hair clippings are produced the vacuum hose 40, connected to the vacuum pump, which is operating to create a reduced pressure atmosphere within the cavity relative to the cabin, quickly and cleanly disposes of the clippings. In view of reduced gravity in space the device is easily rotated about the astronauts neck so that the device essentially follows the muscle movements of the baber as shown in FIGS. 2 and 3. Both astronaut and barber can be completely secured within the cabin by placing their feet through stirrups 67 shown in FIGS. 2 and 3. The astronaut is also preferably restrained in a seated position.

The device may also be used to collect the aerosol droplets of hair spray or small powder residue and the residue of other cosmetics which otherwise would float freely throughout the cabin if applied to an individual not using the present invention.

A manicure can be conducted using the device of the invention. To recieve such a service the astronaut places his hands through aperture 22 of the collar 18 parting seal flap 62, and the manicurist, by placing his hands through top slits 55 of flexible cover 20, can clip the nails and cuticles of an astronaut. The nail and cuticle clippings thus produced can be quickly disposed of via vacuum hose 40 within cavity 38. When the device is used as a manicure station, the air filter can be removed and an appropiate support can be inserted in place of the air filter to elevate the device or support the device so the astronaut receiving the manicure can rest comfortably.

Hair cutting tools and/or manicure tools may be releasably attached, for example by magnets, or VELCRO type fasteners, to the top surface of collar 18 as illustrated by scissors 63 in FIG. 1.

Figure 5:
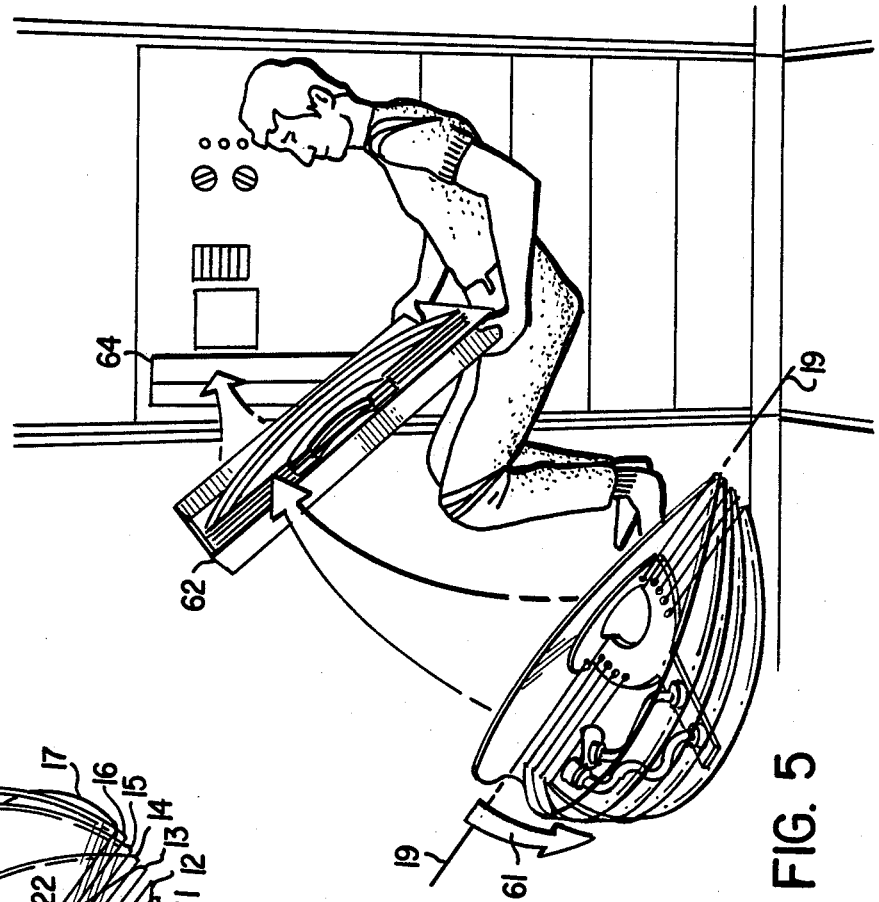
FIG. 5 is a sequence of diagrams illustrating the portability of the device of the invention.

The device 10 of the invention has low mass and is portable and can be easily and quickly stored within the crew cabin. For instance, after grooming activities are concluded, and the astronaut is removed from the device, ribs 11–17 are folded in the direction of arrow 61 of FIG. 5, and collar half section 54 is folded along hinge line 19, to collapse device 10. Vacuum hose 40 is disconnected from the collapsed device aand the device is then placed in container 62 and stored in cabinet 64 as shown in FIG. 5.

While the device of the instant invention has been described and illustrated, it should be apparent that many modifications may be made thereto without departing from the spirit and scope of the invention. Accordingly, the disclosed invention is not limited by the foregoing description, but is only limited by the scope of the claims appended hereto.

I claim:

1. A device for collecting particles produced during grooming, comprising:
    a cover, said cover having at least one slit;
    means for supporting said cover against collapse comprising a collar and a plurality of ribs, each rib having two linear segments, said linear segments of said ribs being hingedly attached to a periphery of said collar, allowing said rib structure to be collapsed;
    said cover and said collar defining a cavity;
    said collar providing means for permitting access to aid cavity by an appendage to be groomed; and
    means for creating a reduced atmosphere within said cavity.

2. The device of claim 1, further including an air filter, and a tube means for connecting said air filter to the interior of said cavity.

3. The device of claim 2, wherein said collar includes an arm integrally attached thereto, said arm comprising a means for supporting said air filter and said means for creating a reduced atmosphere.

4. A device for collecting particles produced during grooming, comprising:
    a cover, said cover having at least one slit;
    a frame having a collar defining an aperture, and a plurality of ribs attached around a periphery of the collar, each of said ribs having an arcuate portion and two linear segments integrally attached thereto, said linear segments attaching said ribs to the periphery of said collar thereby comprising a ribbed framework, said cover located over said framework and supported by said ribbed framework, said cover attached to said collar forming a cavity; and
    means for creating a reduced atmosphere within said cavity.

5. The device of claim 4, further including an air filter, and a tube means for connecting said air filter to the interior of said cavity.

6. The device if claim 5, wherein said collar includes an arm integrally attached thereto, said arm comprising a means for supporting said air filter and said vacuum hose.

7. The device of claim 4, wherein said linear segments of said ribs are hingedly attached around the periphery of said collar allowing said rib structure to be collapsed.

8. The device of claim 4 further comprising at least one manicure and/or hair cutting tool releasably attached to the top face of collar 18.

9. A device for collecting particles produced during grooming the head of a person, comprising:
    a flexible, transparent cover having at least one slit;
    a frame having a collar adapted to fit around the neck of said person and defining an aperture, and a plurality of ribs attached around a periphery of the collar, each of said ribs having an arcuate portion and two linear segments integrally attached thereto, said linear segments attaching said ribs to the periphery of said collar, thereby comprising a ribbed framework, said cover located over said framework and supported by said ribbed framework, said cover attached to said collar forming a cavity;
    means for creating a reduced atmosphere within said cavity; and
    air supply means for enabling said person to breathe.

10. The device of claim 9, wherein said collar is comprised of two half sections pivotally secured to one another whereby the half sections may be pulled apart, opening the collar and enabling it to be fitted around the person's neck.

11. The device of claim 10, including a flexible flap seal having two half sections, one each of which being secured to an associated collar half section so as to conform to the contours of the person's neck, whereby a slight vacuum may be maintained in said cavity.

* * * * *